(12) United States Patent
Ninagawa (10) Patent No.: US 8,831,610 B2
(45) Date of Patent: Sep. 9, 2014

(54) RADIO COMMUNICATION SYSTEM, RADIO BASE STATION, RADIO RELAY STATION AND RADIO COMMUNICATION METHOD

(75) Inventor: Takayasu Ninagawa, Daito (JP)

(73) Assignee: KYOCERA Corporation, Kyoto (JP)

( * ) Notice: Subject to any disclaimer, the term of this patent is extended or adjusted under 35 U.S.C. 154(b) by 551 days.

(21) Appl. No.: 13/061,279

(22) PCT Filed: Aug. 28, 2009

(86) PCT No.: PCT/JP2009/065115
§ 371 (c)(1),
(2), (4) Date: Feb. 28, 2011

(87) PCT Pub. No.: WO2010/024410
PCT Pub. Date: Mar. 4, 2010

(65) Prior Publication Data
US 2011/0159874 A1    Jun. 30, 2011

(30) Foreign Application Priority Data

Aug. 28, 2008  (JP) ................................ 2008-219404

(51) Int. Cl.
*H04W 36/00* (2009.01)
*H04W 4/00* (2009.01)
*H04B 7/155* (2006.01)
*H04W 84/04* (2009.01)
*H04B 7/26* (2006.01)

(52) U.S. Cl.
CPC ........ *H04W 36/0061* (2013.01); *H04W 84/047* (2013.01); *H04B 7/155* (2013.01); *H04B 7/2606* (2013.01)
USPC ........... 455/436; 455/437; 455/438; 455/439; 370/331

(58) Field of Classification Search
CPC ..... H04W 36/00; H04W 36/08; H04W 36/14; H04W 36/30
USPC .......................... 455/436–438, 442; 370/331
See application file for complete search history.

(56) References Cited

U.S. PATENT DOCUMENTS

| 6,819,923 B1* | 11/2004 | Friman .......................... 455/424 |
| 2007/0086387 A1* | 4/2007 | Kang et al. .................... 370/331 |

(Continued)

FOREIGN PATENT DOCUMENTS

| JP | 2002-533032 A | 10/2002 |
| JP | 2006-311253 A | 11/2006 |

(Continued)

OTHER PUBLICATIONS

International Search Report and Written Opinion dated Dec. 8, 2009 issued by the Japanese Patent Office for International Application No. PCT/JP2009/065115.

(Continued)

*Primary Examiner* — Inder Mehra
(74) *Attorney, Agent, or Firm* — Procopio, Cory, Hargreaves & Savitch LLP (57) ABSTRACT

The radio communication system has a radio base station, a radio relay station connectable to the radio base station, and a radio terminal configured to connect to the radio base station. The radio base station notifies the radio terminal of identification information for a predetermined number of relay stations based on the number of radio relay stations that can be simultaneously connected to the radio base station. When the radio relay station is connected to the radio base station, identification information for any one of the relay stations is assigned to the radio relay station. The radio terminal performs a cell search based on the relay station identification information.

14 Claims, 4 Drawing Sheets

(56) References Cited

U.S. PATENT DOCUMENTS

2007/0086388 A1* 4/2007 Kang et al. .................... 370/331
2007/0105558 A1* 5/2007 Suh et al. ...................... 455/436

FOREIGN PATENT DOCUMENTS

| | | |
|---|---|---|
| JP | 2007-116696 A | 5/2007 |
| JP | 2007-116697 A | 5/2007 |
| JP | 2008-048366 A | 2/2008 |
| JP | 2008-054160 A | 3/2008 |
| KR | 10-2007-0050270 A | 5/2007 |

OTHER PUBLICATIONS

Notification of Reasons for Refusal dated Nov. 1, 2011, issued for counterpart Japanese Application No. 2008-219404.

Notice of Grounds for Rejection dated May 24, 2012, issued in counterpart Korean Application No. 10-2011-7005562.

Office Action dated Mar. 27, 2012, issued in counterpart Japanese Application No. 2008-219404.

* cited by examiner

RADIO COMMUNICATION SYSTEM, RADIO BASE STATION, RADIO RELAY STATION AND RADIO COMMUNICATION METHOD

TECHNICAL FIELD

The present invention relates to a radio communication system, a radio base station, a radio relay station and a radio communication method for notifying a radio terminal of handover candidate information indicating handover candidates of the radio terminal.

BACKGROUND ART

In a radio communication system, a radio terminal performs handover to switch its connection destination to a radio base station having better conditions. To enable execution of handover, the radio base station notifies the radio terminal connected to the radio base station itself of handover candidate information including base station identification information for identifying radio base stations in a neighborhood of the radio base station itself (referred to below as "neighboring radio base station") (see Patent Document 1). Such handover candidate information is also referred to as a neighbor list.

The radio terminal performs a search (so-called cell search) on the neighboring radio base stations which are handover candidates, according to the handover candidate information notified by the radio base station. For example, the radio terminal captures, according to the handover candidate information, a radio signal (such as a pilot signal) transmitted by a neighboring radio base station to thereby detect the neighboring radio base station, and performs handover to the neighboring radio base station if the signal quality of the radio signal is at a certain level or higher.

Recently, a radio relay station for relaying data transmitted and received by a radio base station and a radio terminal has been widely used. The radio terminal is capable of performing not only handover between radio base stations but also handover from a radio base station to a radio relay station. Accordingly, the radio base station is required to notify the radio terminal of handover candidate information including not only the base station identification information but also relay station identification information for identifying radio relay stations which are handover candidates (specifically, radio relay stations connected to the radio base station).

CITATION LIST

Patent Document

Patent Document 1: Published Japanese Translation of PCT International Application No. 2002-533032 (see paragraph [0002] and others)

SUMMARY OF THE INVENTION

In this regard, since radio base stations are fixed and operate on a full-time basis, base station identification information included in handover candidate information is also basically fixed. On the other hand, since radio relay stations are moveable in some cases and are frequently switched between operating/non-operating states (turned on/off), radio relay stations connecting to a radio base station change from time to time. For this reason, if the radio base station updates relay station identification information to be included in handover candidate information according to this change, there is a problem that the processing load of the radio base station increases.

Here, in a conceivable method to fix the relay station identification information to be included in the handover candidate information, the relay station identification information on all radio relay stations used in the radio communication system may be included in the handover candidate information. However, such a method requires tens of thousands to hundreds of thousands of pieces of relay station identification information to be included in the handover candidate information, which increases communication resource consumption as well as the processing load for performing a cell search.

Hence, the present invention provides a radio communication system, a radio base station, a radio relay station and a radio communication method which allow a radio terminal to perform handover to a radio relay station connected to a radio base station even in a case where the radio relay stations connecting to the radio base station change from time to time, and which suppress increase in consumption of communication resource as well as in the processing load.

The present invention has the following aspects. According to a first aspect of the present invention, there is provided a radio communication system comprising: a radio base station (e.g. radio base station 100); a radio relay station (e.g. radio relay station 300) connectable to the radio base station; and a radio terminal (e.g. radio terminal 500) configured to connect to the radio base station and to perform a search on handover candidates according to handover candidate information indicating the handover candidates from the radio base station, wherein the radio base station comprises a notification unit (candidate information notification unit 131) configured to notify the radio terminal of the handover candidate information including a predetermined number of pieces of relay station identification information, the predetermined number being set based on the number of radio relay stations connectable to the radio base station at the same time, one piece of the relay station identification information is assigned to the radio relay station when the radio relay station connects to the radio base station, and the radio terminal detects the radio relay station connected to the radio base station, by performing the search according to the pieces of relay station identification information included in the handover candidate information.

According to such a radio communication system, when the radio relay station connects to the radio base station, one piece of the relay station identification information is assigned to the radio relay station, and the radio terminal detects the radio relay station connected to the radio base station by performing a search according to the pieces of relay station identification information included in handover candidate information. Accordingly, the radio terminal can perform handover to the radio relay station connected to the radio base station even in a case where the radio relay stations connecting to the radio base station change from time to time.

According to a second aspect, there is provided a radio base station (e.g. radio base station 100) connectable with a radio relay station (e.g. radio relay station 300) and configured to connect to a radio terminal (e.g. radio terminal 500) which performs a search on handover candidates according to handover candidate information indicating the handover candidates, the radio base station comprising a notification unit (candidate information notification unit 131) configured to notify the radio terminal of the handover candidate information including a predetermined number of pieces of relay station identification information, the predetermined number being set based on the number of radio relay stations connectable to the radio base station at the same time, wherein one piece of the relay station identification information is assigned to the radio relay station when the radio relay station connects to the radio base station.

According to a third aspect, there is provided a radio relay station (e.g. radio relay station 300) connectable with a radio base station (e.g. radio base station 100) connecting to a radio terminal (e.g. radio terminal 500) which performs a search on handover candidates according to handover candidate information indicating the handover candidates, wherein one of a predetermined number pieces of relay station identification information is assigned to the radio relay station when the radio relay station connects to the radio base station, the predetermined number being set based on the number of radio relay stations connectable to the radio base station at the same time, and the radio base station notifies the radio terminal of the handover candidate information including the pieces of relay station identification information.

According to a fourth aspect, there is provided a radio communication method comprising the steps of: connecting, at a radio relay station (e.g. radio relay station 300), to a radio base station (e.g. radio base station 100); connecting, at a radio terminal (e.g. radio terminal 500), to the radio base station; performing, at the radio terminal, a search on handover candidates according to handover candidate information indicating handover candidates from the radio base station; notifying (e.g. step S103), from the radio base station to the radio terminal, of the handover candidate information including a predetermined number of pieces of relay station identification information, the predetermined number being set based on the number of radio relay stations connectable to the radio base station at the same time; assigning (e.g. step S108) one piece of the relay station identification information to the radio relay station when the radio relay station connects to the radio base station; and detecting (e.g. step S110), at the radio terminal, the radio relay station connected to the radio base station through the search performed according to the pieces of relay station identification information included in the handover candidate information.

According to the present invention, the radio terminal can perform handover to the radio relay station connected to the radio base station even in a case where the radio relay stations connecting to the radio base station change from time to time.

DESCRIPTION OF EMBODIMENTS

Next, a description will be given with reference to the drawings of a radio communication system according to an embodiment of the present invention. To be specific, descriptions will be given of (1) Schematic Configuration of Radio Communication System, (2) Example of Handover Candidate Information, (3) Detailed Configuration of Radio Communication System, (4) Operation of Radio Communication System, (5) Conclusion, and (6) Other Embodiments. The same or similar components are assigned the same or similar reference numerals in the descriptions of drawings in the following embodiments.

(1) SCHEMATIC CONFIGURATION OF RADIO COMMUNICATION SYSTEM

Figure 1:
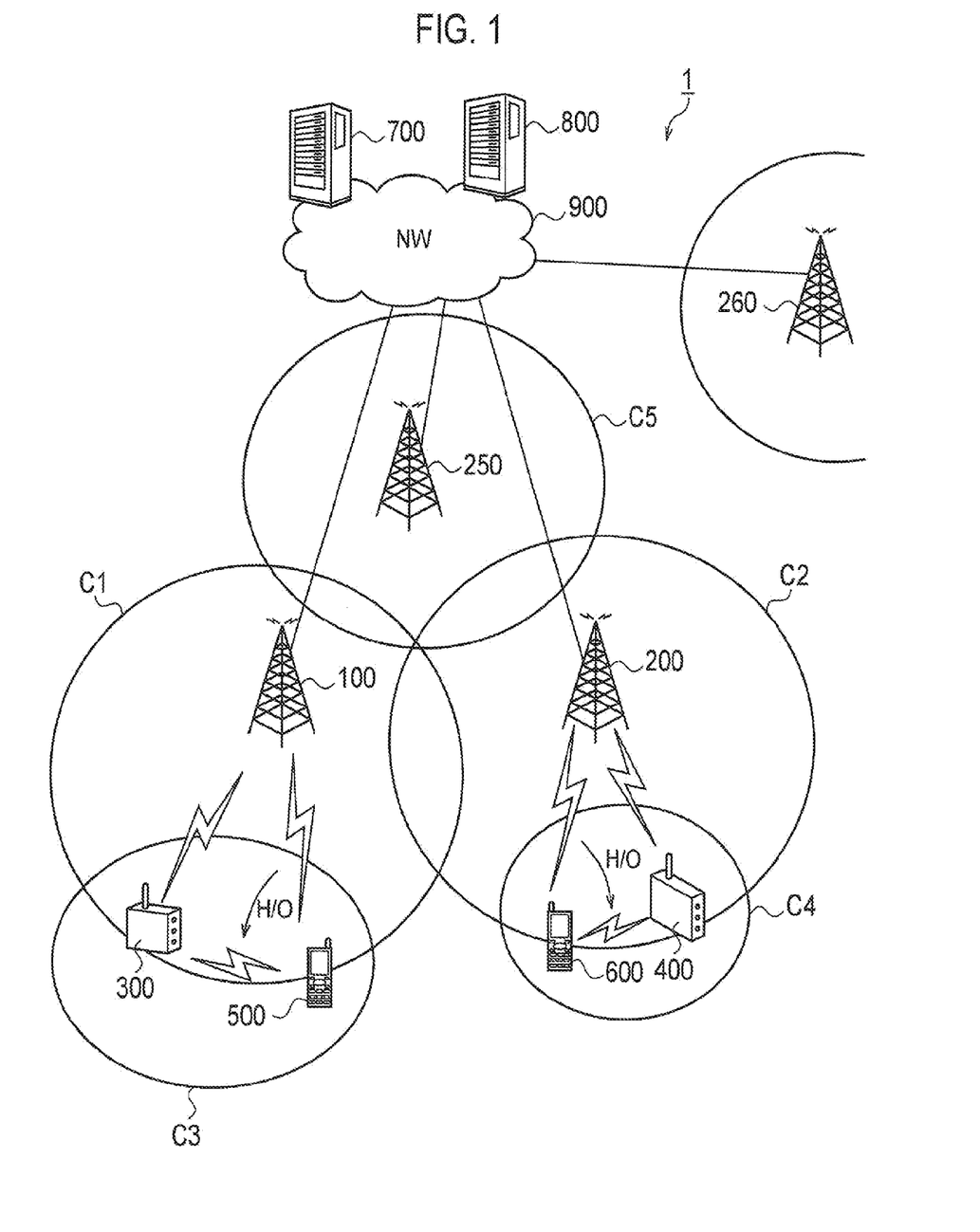
FIG. 1 is a schematic configuration diagram of a radio communication system according to an embodiment of the present invention.

FIG. 1 is a schematic configuration diagram of a radio communication system 1 according to the embodiment.

As shown in FIG. 1, the radio communication system 1 includes a radio base station 100 and a radio terminal 500 connected to the radio base station 100. The radio base station 100 forms a cell C1 which is an area connectable with the radio terminal 500, and the radio terminal 500 is located at a fringe (cell fringe) of the cell C1.

A radio relay station 300 is located near the radio terminal 500. The radio relay station 300 is a small radio relay station which can be installed indoors, for example, and is moveable and can be turned on/off. Hence, the radio relay station 300 is frequently switched between states of connecting and not connecting to the radio base station 100.

The radio terminal 500 can perform handover from the radio base station 100 to the radio relay station 300 in a state where the radio relay station 300 is connected to the radio base station 100. Having been connected to the radio relay station 300, the radio terminal 500 can exchange data with the radio base station 100 via the radio relay station 300 even outside the cell C1, for example, if the radio terminal 500 is located inside a cell C3 formed by the radio relay station 300.

In the example of FIG. 1, a radio base station 200 and a radio base station 250 are installed near the radio base station 100. In other words, the radio base station 200 and the radio base station 250 are neighboring radio base stations of the radio base station 100. The radio base station 200 forms a cell C2 and the radio base station 250 forms a cell C5.

The radio base station 100 notifies the radio terminal 500 of handover candidate information indicating handover candidates of the radio terminal 500. The handover candidate information includes base station identification information for identifying neighboring radio base stations (radio base station 200 and radio base station 250) which are handover candidates of the radio terminal 500.

Further, the handover candidate information includes a certain number (referred to below as a "finite number") of pieces of relay station identification information, the certain number previously set based on the number of radio relay stations connectable to the radio base station 100 at the same time. For example, if the number of radio relay stations connectable to the radio base station 100 at the same time is determined to be three through empirical or experimental observation, three pieces of relay station identification information are included in the handover candidate information. Otherwise, five pieces of relay station identification information containing spare pieces of identification information may be included in the handover candidate information. Although for the sake of convenience, the following description is given of an example in which three pieces of relay station identification information are included in handover candidate information, about ten pieces of relay station identification information may be included in handover candidate information.

When the radio relay station 300 connects to the radio base station 100, one of a finite number of relay station information is assigned to the radio relay station 300. Then, the radio terminal 500 performs a cell search according to the base station identification information and relay station identification information included in the handover candidate information notified by the radio base station 100.

As similar to the radio base station 100, each of the radio base station 200 and the radio base station 250 holds the three pieces of relay station identification information and has a function of transmitting a notification containing handover candidate information which includes the pieces of relay station identification information. Here, the radio base station 100, the radio base station 200 and the radio base station 250 respectively hold such unique sets of relay station identification information that the pieces of information do not overlap between the sets.

In addition, a radio terminal 600 connected to the radio base station 200 is located at a cell fringe of the cell C2, and a radio relay station 400 is located near the radio terminal 600. The radio relay station 400 is a small radio relay station, for example, as similar to the radio relay station 300. The radio terminal 600 can perform handover from the radio base station 200 to the radio relay station 400 in a state where the radio relay station 400 is connected to the radio base station 200.

The radio base station 100, the radio base station 200 and the radio base station 250 are connected to a backbone network (simply referred to below as "NW") 900. A management server 700 which manages the radio base station 100, the radio base station 200 and the radio base station 250 is installed in the NW 900. The management server 700 manages not only the radio base station 100, the radio base station 200 and the radio base station 250 but also the respective radio relay stations connected to the radio base stations.

In addition, a management server 800 which manages a radio base station 260 and radio relay stations connected to the radio base station 260 is also installed in the NW 900. As similar to the radio base station 100, the radio base station 200 and the radio base station 250, the radio base station 260 holds a finite number of pieces of relay station identification information and has a function of transmitting a notification containing handover candidate information which includes the pieces of relay station identification information. Here, the pieces of relay station identification information held by the radio base station 260 may overlap with the pieces of relay station identification information held by the radio base station 100, the radio base station 200 or the radio base station 250. This is because the radio relay stations under the radio base station 260 and the radio relay stations under each of the radio base station 100, the radio base station 200 and the radio base station 250 are not within a range that is viewable from the radio terminal at the same time (that is, a range where the radio terminal can receive radio signals at the same time).

(2) EXAMPLE OF HANDOVER CANDIDATE INFORMATION

Figure 2:
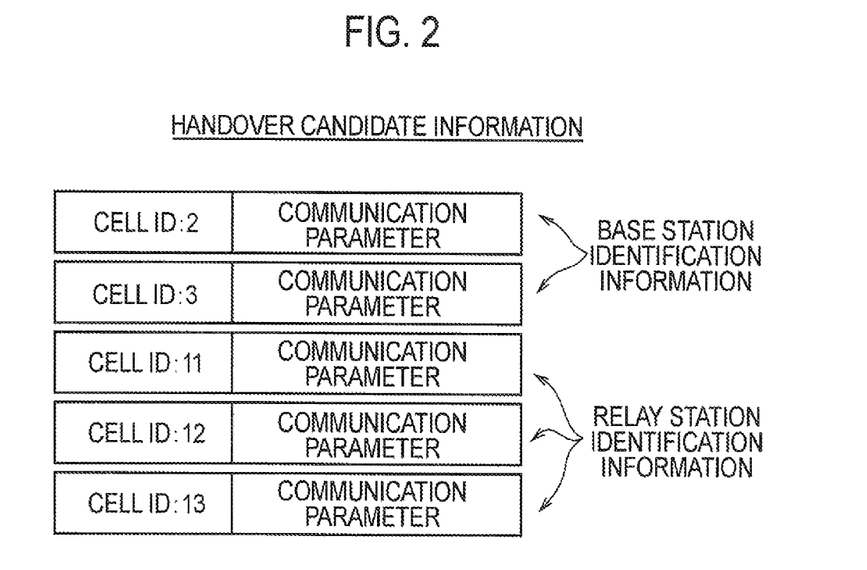
FIG. 2 is a diagram showing an example of handover candidate information according to the embodiment of the present invention.

FIG. 2 is a diagram showing an example of handover candidate information notified by the radio base station 100 to the radio terminal 500.

As shown in FIG. 2, handover candidate information includes base station identification information for identifying neighboring radio base stations of the radio base station 100 (radio base station 200 and radio base station 250), and a finite number (three in this example) of pieces of relay station identification information. In the example of FIG. 2, the cell ID of the radio base station 200 is "2" and the cell ID of the radio base station 250 is "3." Each of the cell IDs of the radio base station 200 and the radio base station 250 is a unique ID assigned at the time of installation of the radio base station 200 and the radio base station 250.

Base station identification information is information in which a cell ID and a communication parameter corresponding to the communication property of the radio base station are associated. Communication parameters include information indicating a communication frequency of the radio base station, information indicating a QoS (quality of service) that the radio base station supports, and the like. Each piece of relay station identification information is configured in the same manner as base station identification information, and is information in which a cell ID and a communication parameter corresponding to the communication property of the radio relay station are associated with each other. Note, however, that relay station identification information is different from base station identification information in that it is temporarily assigned to radio relay stations connected to the radio base station 100. The radio base station 100 assigns a radio relay station connected to the radio base station 100 one of the finite number of pieces of relay station identification information which is unassigned and which matches with the communication property of the radio relay station.

The radio terminal 500 detects a handover candidate (radio base station or radio relay station) by performing a cell search according to handover candidate information. This embodiment uses a known cell-search technique. For example, a radio signal (such as a pilot signal) periodically transmitted by the handover candidate (radio base station or radio relay station) includes a cell ID, and the radio terminal 500 detects the handover candidate according to base station identification information and relay station identification information included in handover candidate information. If multiple handover candidates are detected, the radio terminal 500 determines the candidate having the highest receiving quality of the radio signal (such as a received power or a received SNR) as the handover target.

(3) DETAILED CONFIGURATION OF RADIO COMMUNICATION SYSTEM

Next, a detailed configuration of the radio communication system 1 will be described in the order of (3.1) Configuration of Radio Base Station and (3.2) Configuration of Radio Relay Station.

(3.1) Configuration of Radio Base Station

Figure 3:
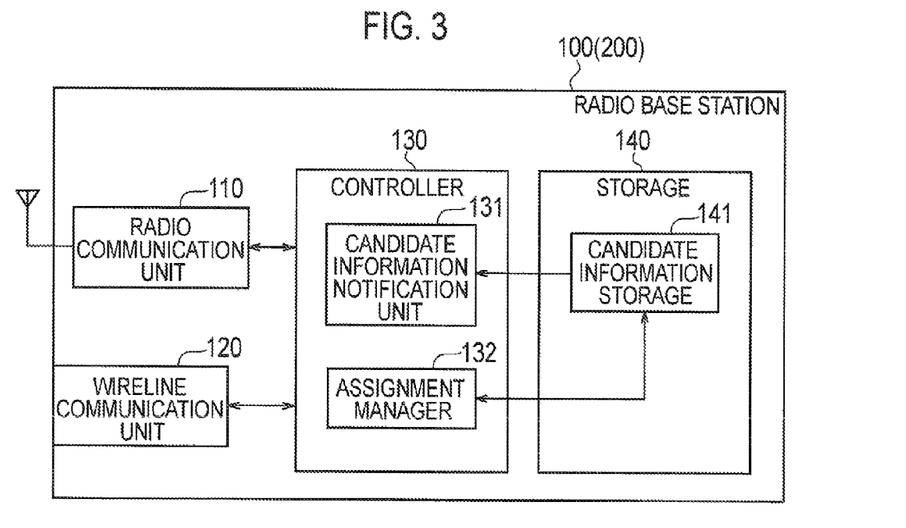
FIG. 3 is a block diagram showing a functional block configuration of a radio base station according to the embodiment of the present invention.

FIG. 3 is a block diagram showing a functional block configuration of the radio base station 100. Note that the radio base station 200, the radio base station 250 and the radio base station 260 are configured in the same manner as the radio base station 100 and thus descriptions thereof are omitted.

As shown in FIG. 3, the radio base station 100 includes a radio communication unit 110, a wireline communication unit 120, a controller 130 and a storage 140. The radio communication unit 110 includes an LNA (low noise amplifier), a power amplifier, an upconverter, a downconverter and the like, and transmits and receives radio signals. In addition, the radio communication unit 110 periodically transmits a radio signal including the cell ID of the radio base station 100 to the area inside the cell C1. The wireline communication unit 120 functions as an interface with the NW 900 and is used to communicate with the management server 700 in the NW 900. The controller 130 is configured of a CPU, for example, and controls various functions of the radio base station 100. The storage 140 is configured of a memory, for example, and stores therein various information used for control and the like by the radio base station 100.

The controller 130 includes a candidate information notification unit 131 (notification unit) and an assignment manager 132. The storage 140 includes a candidate information storage 141. The candidate information storage 141 previously stores therein handover candidate information as shown in FIG. 2. Note, however, that the candidate information storage 141 may be omitted in a case where the handover candidate information shown in FIG. 2 is stored in the management server 700. The candidate information notification unit 131 notifies the radio terminal 500 of the handover candidate information shown in FIG. 2 through the radio communication unit 110.

The assignment manager 132 assigns the radio relay station 300 connected to the radio base station 100 one piece of the finite number of relay station identification information which is unassigned and which matches with the communication property of the radio relay station 300. The piece of relay station identification information assigned by the assignment manager 132 is notified to the radio terminal 500 through the radio communication unit 110, and the management server 700 is notified to that effect through the wireline communication unit 120.

Any of the following methods (a) to (c) is used, for example, as the method for the assignment manager 132 to assign a piece of relay station identification information to the radio relay station 300.

(a) At the time of connecting to the radio base station 100, the radio terminal 300 notifies the radio base station 100 of a MAC address of the radio relay station 300. The assignment manager 132 detects the connection of the radio relay station from the notified MAC address, and negotiates with the radio relay station 300 to assign the radio relay station 300 a piece of relay station identification information that matches with the communication property of the radio relay station 300.

(b) At the time of connecting to the radio base station 100, the radio terminal 300 requests assignment of a piece of relay station identification information to the radio base station 100. In response to the request for assignment of the piece of relay station identification information, the assignment manager 132 negotiates with the radio relay station 300 to assign the radio relay station 300 the piece of relay station identification information that matches with the communication property of the radio relay station 300.

(c) The radio relay station 300 receives handover candidate information transmitted from the radio base station 100, selects one piece of relay station identification information that matches with the communication property of the radio relay station 300 from among the pieces of relay station identification information included in the handover candidate information, and requests assignment of the selected piece of relay station identification information to the radio base station 100. In response to the request for assignment of the piece of relay station identification information, the assignment manager 132 assigns the piece of relay station identification information to the radio relay station 300 if the piece of relay station identification information selected by the radio relay station 300 is unassigned.

(3.2) Configuration of Radio Relay Station

Figure 4:
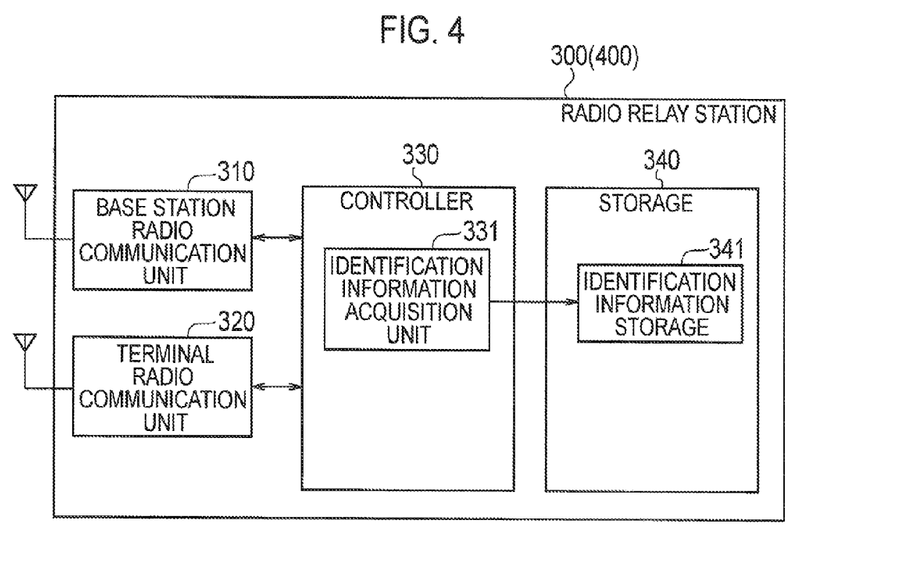
FIG. 4 is a block diagram showing a functional block configuration of a radio relay station according to the embodiment of the present invention.

FIG. 4 is a block diagram showing a functional block configuration of the radio relay station 300. Note that the radio relay station 400 is configured in the same manner as the radio relay station 300 and thus descriptions thereof are omitted.

As shown in FIG. 4, the radio relay station 300 includes a base station radio communication unit 310, a terminal radio communication unit 320, a controller 330 and a storage 340. The base station radio communication unit 310 includes an LNA, a power amplifier, an upconverter, a downconverter and the like, and transmits and receives radio signals to and from the radio base station 100. The terminal radio communication unit 320 includes an LNA, a power amplifier, an upconverter, a downconverter and the like, and transmits and receives radio signals to and from the radio terminal. In addition, the terminal radio communication unit 320 periodically transmits, to the area inside the cell C1, a radio signal including the cell ID assigned to the radio relay station 300. The controller 330 is configured of a CPU, for example, and controls various functions of the radio relay station 300. The storage 340 is configured of a memory, for example, and stores therein various information used for control and the like by the radio relay station 300.

The controller 330 includes an identification information acquisition unit 331. The storage 340 includes an identification information storage 341. The identification information acquisition unit 331 acquires the piece of relay station identification information, which is assigned by the assignment manager 132, through the base station radio communication unit 310. The identification information storage 341 stores therein the piece of relay station identification information acquired by the identification information acquisition unit 331.

Note that the radio relay station 300 may notify a radio terminal connected to the station itself of handover candidate information. For example, the controller 330 may transmit a notification containing handover candidate information, which is notified by the radio base station 100 to the radio terminal 500, while excluding the piece of relay station identification information assigned to the radio relay station 300. Alternatively, the radio relay station 300 may transmit a notification containing, as handover candidate information, only base station identification information on the radio base station 100 to which the radio relay station 300 is connected.

(4) OPERATION OF RADIO COMMUNICATION SYSTEM

Figure 5:
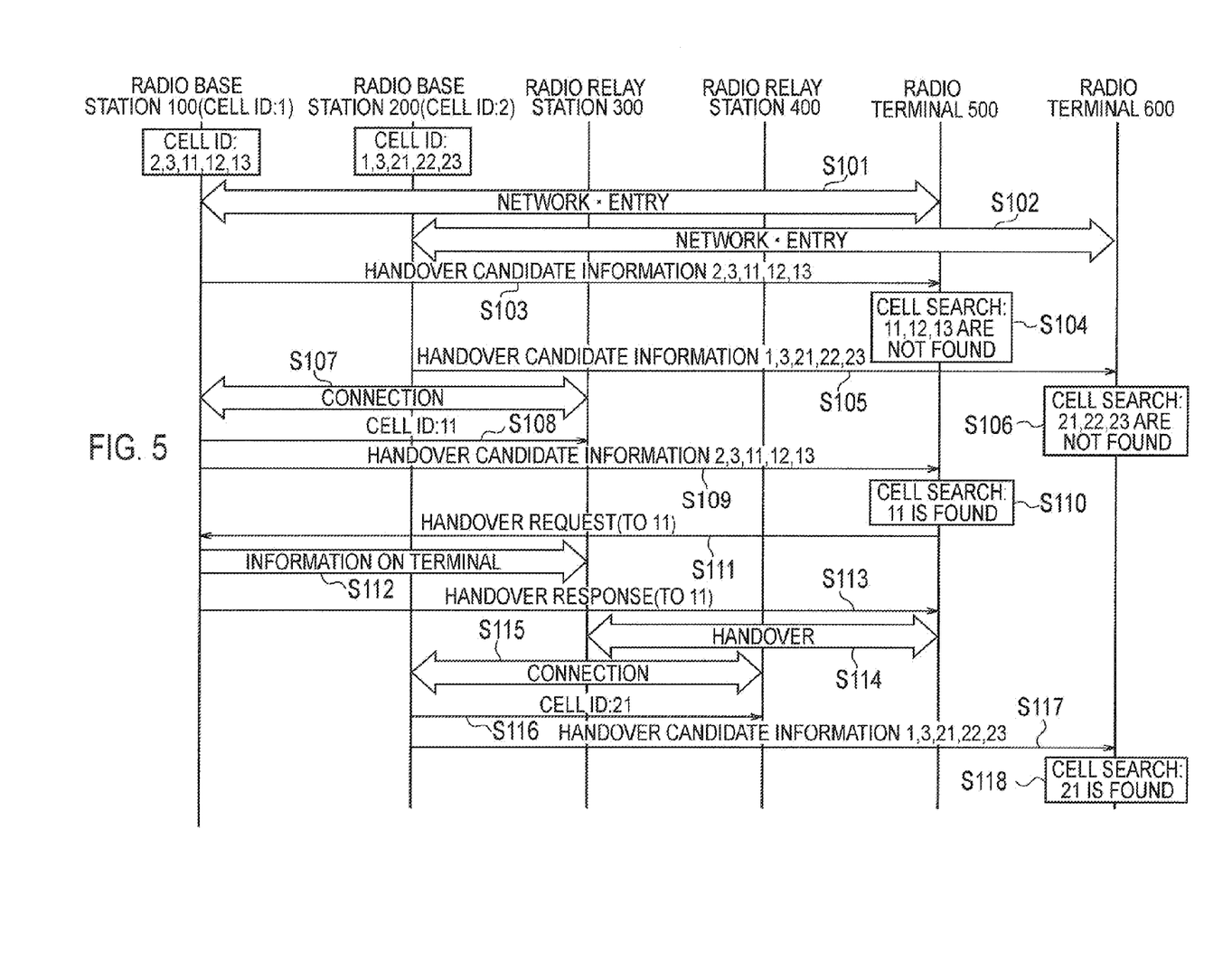
FIG. 5 is a sequence diagram showing an operation example of the radio communication system according to the embodiment of the present invention.

Next, a description will be given of an operation of the radio communication system 1. FIG. 5 is a sequence diagram showing an operation example of the radio communication system 1. In this operation example, a description is given of a case where the radio terminal 500 connects to the radio base station 100 and then performs handover to the radio relay station 300, while the radio terminal 600 connects to the radio base station 200 and then performs handover to the radio relay station 400.

In the example of FIG. 5, the radio base station 100 previously holds handover candidate information on cell IDs 2, 3, 11, 12 and 13. Here, the cell ID: 2 represents base station identification information on the radio base station 200 and the cell ID: 3 represents base station identification information on the radio base station 250. Each of the cell IDs 11, 12 and 13 represents one of a finite number of pieces of relay station identification information.

In addition, the radio base station 200 previously holds handover candidate information on cell IDs 2, 3, 11, 12 and 13. Here, the cell ID: 1 represents base station identification information on the radio base station 100 and the cell ID: 3 represents base station identification information on the radio base station 250. Each of the cell IDs 21, 22 and 23 represents one of a finite number of pieces of relay station identification information.

In step S101, the radio terminal 500 performs network entry which is initial connection processing to connect to the radio base station 100. In step S102, the radio terminal 600 performs network entry which is initial connection processing to connect to the radio base station 200.

Upon connection of the radio terminal 500 to the radio base station 100, the candidate information notification unit 131 of the radio base station 100 notifies the radio terminal 500 of the handover candidate information (cell IDs: 2, 3, 11, 12 and 13) in step S103, the handover candidate information being held in the candidate information storage 141.

In step S104, the radio terminal 500 performs a cell search according to the handover candidate information notified by the radio base station 100. At this point, the radio relay station 300 is not connected to the radio base station 100, and thus the radio terminal 500 cannot detect the radio relay station 300 by the cell search. Moreover, the radio terminal 500 is located outside the cell C2 or the cell C5, and thus cannot detect the radio base station 200 or the radio base station 250 by the cell search.

Upon connection of the radio terminal 600 to the radio base station 200, the candidate information notification unit 131 of the radio base station 200 notifies the radio terminal 600 of the handover candidate information (cell IDs: 1, 3, 21, 22 and 23) in step S105, the handover candidate information being held in the candidate information storage 141.

In step S106, the radio terminal 600 performs a cell search according to the handover candidate information notified by the radio base station 200. At this point, the radio relay station 400 is not connected to the radio base station 200, and thus the radio terminal 600 cannot detect the radio relay station 400 by the cell search. Moreover, the radio terminal 600 is located outside the cell C1 or the cell C5, and thus cannot detect the radio base station 100 or the radio base station 250 by the cell search.

In step S107, the radio relay station 300 connects to the radio base station 100 by either moving into the cell C1 that the radio base station 100 forms or by being turned on. The radio relay station 300 forms a cell C3.

Upon connection of the radio relay station 300 to the radio base station 100, the assignment manager 132 of the radio base station 100 assigns one of unassigned pieces of relay station identification information (cell IDs: 11, 12 and 13) to the relay station 300 in step S108. Here, the piece of relay station identification information represented by the cell ID 11 is assigned to the radio relay station 300. The assigned piece of relay station identification information is notified to the radio relay station 300.

Upon notification of the piece of relay station identification information from the radio base station 100, the identification information acquisition unit 331 of the radio relay station 300 acquires the notified piece of relay station identification information and stores it to the identification information storage 341. Then, the terminal radio communication unit 320 of the radio relay station 300 transmits (broadcasts) a radio signal including the piece of relay station identification information (cell ID: 11) stored in the identification information storage 341 to the area inside the cell C3.

In step S109, the candidate information notification unit 131 of the radio base station 100 again notifies the radio terminal 500 of the handover candidate information (cell IDs 2, 3, 11, 12 and 13) held in the candidate information storage 141.

In step S110, the radio terminal 500 performs a cell search according to the handover candidate information notified by the radio base station 100. At this point, the radio relay station 300 is connected to the radio base station 100, and thus the radio terminal 500 can detect (capture) through the cell search a radio signal transmitted by the radio relay station 300. Here, the radio terminal 500 determines to perform handover from the radio base station 100 to the radio relay station 300 if a predetermined handover condition (such as a signal quality from the radio relay station 300 being higher than a signal quality from the radio base station 100) is satisfied.

In step S111, the radio terminal 500 transmits to the radio base station 100 a handover request for requesting handover to the radio relay station 300 (cell ID: 11). Upon receipt of the handover request, the radio base station 100 notifies the radio relay station 300 of information on the radio terminal 500 in step S112. Further, in step S113, the radio base station 100 transmits a handover response which is a response to the handover request to the radio terminal 500. Upon receipt of the handover response from the radio base station 100, the radio terminal 500 performs handover from the radio base station 100 to the radio relay station 300 in step S114.

Meanwhile, in step S115, the radio relay station 400 connects to the radio base station 200 by either moving into the cell C2 that the radio base station 200 forms or by being turned on. The radio relay station 400 forms a cell C4.

Upon connection of the radio relay station 400 to the radio base station 200, the assignment manager 132 of the radio base station 200 assigns one of unassigned pieces of relay station identification information (cell IDs: 21, 22 and 23) to the relay station 400 in step S116. Here, the piece of relay station identification information represented by the cell ID 21 is assigned to the radio relay station 400. The assigned piece of relay station identification information is notified to the radio relay station 400.

In step S117, the candidate information notification unit 131 of the radio base station 200 again notifies the radio terminal 600 of the handover candidate information (cell IDs 1, 3, 21, 22 and 23) held in the candidate information storage 141.

In step S118, the radio terminal 600 performs a cell search according to the handover candidate information notified by the radio base station 200. At this point, the radio relay station 400 is connected to the radio base station 200, and thus the radio terminal 600 can detect (capture) through the cell search a radio signal transmitted by the radio relay station 400. Here, the radio terminal 600 determines to perform handover from the radio base station 200 to the radio relay station 400 if a predetermined handover condition is satisfied.

Note that although an example of transmitting a handover request from the radio terminal to the radio base station has been described in the operation sequence in FIG. 5, the invention is not limited to such radio terminal driven handover, and radio-base-station-driven handover may be performed instead. In the case of a radio-base-station-driven handover, the operation sequence of FIG. 5 is modified as follows.

Specifically, instead of performing the steps S110 and S111, the radio terminal 500 notifies the radio base station 100 that a signal quality from the radio relay station 300 (cell ID: 11) is higher than a signal quality from the radio base station 100 (cell ID: 1). Then, the radio base station 100 determines to make the radio terminal 500 perform handover from the radio base station 100 to the radio relay station 300. Subsequently, instead of performing the step S113, the radio base station 100 transmits to the radio terminal 500 a handover request for requesting handover to the radio relay station 300 (cell ID: 11). Upon receipt of the handover request from the radio base station 100, the radio terminal 500 performs handover from the radio base station 100 to the radio relay station 300 in step S114.

(5) CONCLUSION

As has been described, when the radio relay station 300 connects to the radio base station 100, one of a finite number of pieces of relay station identification information is assigned to the radio relay station 300. The radio terminal 500 performs a cell search according to handover candidate information including the finite number of pieces of relay station identification information, and detects the radio relay station 300 connected to the radio base station 100. Accordingly, the radio terminal 500 can perform handover to the radio relay station 300 connected to the radio base station 100 even in a case where the radio relay stations connecting to the radio base station 100 change from time to time.

In addition, the radio base station 100 notifies the radio terminal of handover candidate information including a finite number (such as around three to ten) of pieces of relay station identification information, the finite number being previously set based on the number of radio relay stations connectable to the radio base station 100 at the same time. For this reason, the pieces of relay station identification information to be included in the handover candidate information do not need to be updated in the radio base station 100, or tens of thousands to hundreds of thousands of pieces of relay station identification information do not need to be included in the handover candidate information. In other words, it is possible to suppress increase in the processing load of the radio base station 100 and the radio terminal 500, as well as in consumption of communication resource (resource of the NW 900 and radio communication resource).

In this embodiment, the candidate information notification unit 131 of the radio base station 100 notifies the radio terminal 500 of handover candidate information including base station identification information for identifying neighboring radio base stations (radio base station 200 and radio base station 250) and a finite number of pieces of relay station identification information. The conventional radio communication system similarly includes a structure in which the radio base station notifies the radio terminal of handover candidate information including base station identification information, and this embodiment utilizes the same structure to notify the radio terminal of a piece of relay station identification information. Consequently, it is possible to notify the radio terminal of the piece of relay station identification information without largely modifying the conventional radio communication system, and thus the system and method of this embodiment can be implemented at a low cost.

In this embodiment, the radio base station 100, the radio base station 200 and the radio base station 250 managed by the same management server 700 respectively hold such unique sets of relay station identification information that the pieces of information do not overlap between the sets. Accordingly, the management server 700 can uniquely identify the radio relay stations connecting to the radio base station 100, the radio base station 200 and the radio base station 250.

In this embodiment, the radio base station 100 and the radio base station 200 respectively hold such unique sets of relay station identification information that the pieces of information do not overlap between the sets. Thus, it is possible to lower the possibility of assigning the same piece of relay station identification information to two or more radio relay stations which are handover candidates of the radio terminal 500, allowing the radio terminal 500 to more surely identify a radio relay station in a cell search.

(6) OTHER EMBODIMENTS

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

Although in the above embodiment, the radio base station 100 and the radio base station 200 notify the radio terminal 500 of handover candidate information including both of relay station identification information and base station identification information, the invention is not limited to this, and the relay station identification information and base station identification information may be notified separately.

Moreover, the radio base station 100 may include in handover candidate information the relay station identification information held by the radio base station 200. This allows the radio terminal 500 to perform handover from the radio relay station 300 to the radio relay station 400, for example.

Although it has been described in the above embodiment that the radio relay station 300 and the radio relay station 400 are moveable small radio relay stations, the invention is not limited to this, and a fixed radio relay station may be used instead.

As described above, the present invention naturally includes various embodiments which are not described herein. Accordingly, the technical scope of the present invention should be determined only by the matters to define the invention in the scope of claims regarded as appropriate based on the description.

The embodiment has the following aspects. First of all, the gist of a first aspect of the embodiment resides in a radio communication system comprising: a radio base station (radio base station 100, for example); a radio relay station (radio relay station 300, for example) connectable to the radio base station; and a radio terminal (radio terminal 500, for example) connected to the radio base station and configured to perform a search on handover candidates according to handover candidate information indicating the handover candidates from the radio base station, wherein the radio base station includes a notification unit (candidate information notification unit 131) for notifying the radio terminal of the handover candidate information including a predetermined number of pieces of relay station identification information, the predetermined number being set based on the number of radio relay stations connectable to the radio base station at the same time, one piece of the relay station identification information is assigned to the radio relay station when the radio relay station connects to the radio base station, and the radio terminal detects the radio relay station connected to the radio base station by performing the search according to the pieces of relay station identification information included in the handover candidate information.

According to such a radio communication system, when the radio relay station connects to the radio base station, one piece of relay station identification information is assigned to the radio relay station, and the radio terminal detects the radio relay station connected to the radio base station by performing a search according to the pieces of relay station identification information included in handover candidate information. Accordingly, the radio terminal can perform handover to the radio relay station connected to the radio base station even in a case where the radio relay stations connecting to the radio base station change from time to time.

In addition, the notification unit notifies the radio terminal of a predetermined number of pieces of relay station identification information, the predetermined number being set based on the number of radio relay stations connectable to the radio base station at the same time. For this reason, the pieces of relay station identification information to be included in the handover candidate information do not need to be updated in the radio base station, or tens of thousands to hundreds of thousands of pieces of relay station identification information do not need to be notified. Hence, it is possible to suppress increase in consumption of communication resource as well as in the processing load.

Accordingly, the mobile communication system according to the first aspect of the present invention allows the radio terminal to perform handover to the radio relay station connected to the radio base station even in a case where the radio relay stations connecting to the radio base station change from time to time, and can suppress increase in consumption of communication resource as well as in the processing load.

A second aspect of the embodiment relates to the first aspect of the embodiment, and the gist of the second aspect resides in that the notification unit notifies the radio terminal of the handover candidate information including base station identification information for identifying radio base stations (radio base station 200, for example) which are the handover candidates and the relay station identification information.

A third aspect of the embodiment relates to the first or second aspect of the embodiment, and the gist of the third aspect resides in that a plurality of the radio base stations are installed, the plurality of radio base stations include a first radio base station (radio base station 100, for example) and a second radio base station (radio base station 200, for example) managed by the same management server (management server 700, for example), and the first radio base station and the second radio base station respectively hold such unique sets of relay station identification information that the pieces of information do not overlap between the sets.

A fourth aspect of the embodiment relates to the first or second aspect of the embodiment, and the gist of the fourth aspect resides in that a plurality of the radio base stations are installed, the plurality of radio base stations include a first radio base station (radio base station 100, for example) and a second radio base station (radio base station 200, for example) which is a handover candidate for a radio terminal (radio terminal 500, for example) connected to the first radio base station, and the first radio base station and the second radio base station respectively hold such unique sets of relay station identification information that the pieces of information do not overlap between the sets.

A fifth aspect of the embodiment relates to the fourth aspect of the embodiment, and the gist of the fifth aspect resides in that the first radio base station notifies the radio terminal of the handover candidate information which includes the pieces of relay station identification information held by the second radio base station in addition to the pieces of relay station identification information held by the first radio base station.

A sixth aspect of the embodiment relates to the first aspect of the embodiment, and the gist of the sixth aspect resides in that each piece of the relay station identification information includes an identifier (cell ID) for uniquely identifying the radio relay station, and a communication parameter associated with the identifier and corresponding to a communication property of the radio relay station, and the piece of relay station identification information matching with the communication property of the radio relay station is assigned to the radio relay station.

The gist of a seventh aspect of the embodiment resides in a radio base station (radio base station 100, for example) connectable with a radio relay station (radio relay station 300, for example) and connected with a radio terminal (radio terminal 500, for example) which performs a search on handover candidates according to handover candidate information indicating the handover candidates, the radio base station comprising a notification unit (candidate information notification unit 131) configured to notify the radio terminal of the handover candidate information including a predetermined number of pieces of relay station identification information, the predetermined number being set based on the number of radio relay stations connectable to the radio base station at the same time, wherein one piece of the relay station identification information is assigned to the radio relay station when the radio relay station connects to the radio base station.

The gist of an eighth aspect of the embodiment resides in a radio relay station (radio relay station 300, for example) connectable with a radio base station (radio base station 100, for example) connecting to a radio terminal (radio terminal 500, for example) which performs a search on handover candidates according to handover candidate information indicating the handover candidates, wherein one of a predetermined number of pieces relay station identification information is assigned to the radio relay station when the radio relay station connects to the radio base station, the predetermined number being set based on the number of radio relay stations connectable to the radio base station at the same time, and the radio base station notifies the radio terminal of the handover candidate information including the pieces of relay station identification information.

The gist of a ninth aspect of the embodiment resides in the steps of: connecting, by a radio relay station (radio relay station 300, for example) to a radio base station (radio base station 100, for example); connecting, by a radio terminal (radio terminal 500, for example) to the radio base station; performing a search by the radio terminal for handover candidates according to handover candidate information from the radio base station, the handover candidate information indicating the handover candidates; notifying the radio terminal of the handover candidate information including a predetermined number of pieces of relay station identification information by the radio base station, the predetermined number being set based on the number of radio relay stations connectable to the radio base station at the same time (step S103, for example); assigning one piece of the relay station identification information to the radio relay station when the radio relay station connects to the radio base station (step S108, for example); and detecting the radio relay station connected to the radio base station by the radio terminal, through the search performed according to the pieces of relay station identification information included in the handover candidate information (step S110, for example).

This embodiment can provide a radio communication system, a radio base station, a radio relay station and a radio communication method which allow a radio terminal to perform handover to a radio relay station connected to a radio base station even in a case where the radio relay stations connecting to the radio base station change from time to time, and which suppress increase in consumption of communication resource as well as in the processing load.

Note that the entire content of Japanese Patent Application No. 2008-219404 (filed on Aug. 28, 2008) is incorporated herein by reference.

INDUSTRIAL APPLICABILITY

As has been described, the radio communication system, the radio base station, the radio relay station and the radio communication method according to the present invention allow a radio terminal to perform handover to a radio relay station connected to a radio base station even in a case where the radio relay stations connecting to the radio base station change from time to time, and suppress increase in consumption of communication resource as well as in the processing load, and thus are advantageous in radio communication such as mobile communication.

The invention claimed is:

1. A radio communication system comprising:
    a radio base station;
    a radio relay station configured to connect to the radio base station; and
    a radio terminal;
    wherein, when the radio relay station connects to the radio base station,
        the radio base station assigns one of a finite number of relay-station identifications to the radio relay station and transmits the assigned relay-station identification to the radio relay station, and
        the radio relay station subsequently transmits a radio signal comprising the assigned relay-station identification;
    wherein the radio base station notifies the radio terminal of handover candidate information including a predetermined number of station identifications, wherein the station identifications comprise the assigned relay-station identification when the radio relay station is connected to the radio base station, and wherein the predetermined number is set based on the number of radio relay stations connectable to the radio base station at the same time; and
    wherein, subsequent to receiving the handover candidate information from the radio base station, the radio terminal performs a cell search according to the station identifications included in the handover candidate information.

2. The radio communication system according to claim 1, wherein the station identifications included in the handover candidate information comprises information for identifying one or more radio base stations which are handover candidates and information for identifying one or more radio relay stations which are handover candidates.

3. The radio communication system according to claim 2, wherein the system comprises a plurality of radio base stations managed by the same management server, and each of the plurality of radio base stations store unique sets of assignable relay-station identifications such that the assignable relay-station identifications do not overlap between the sets.

4. The radio communication system according to claim 2, wherein the system comprises a plurality of radio base stations, wherein the plurality of radio base stations include a first radio base station and a second radio base station which is a handover candidate of a radio terminal connected to the first radio base station, and wherein the first radio base station and the second radio base station each store unique sets of assignable relay-station identifications such that the assignable relay-station identifications do not overlap between the sets.

5. The radio communication system according to claim 4, wherein the first radio base station notifies the radio terminal of the handover candidate information which includes assignable relay-station identifications stored by the second radio base station, in addition to assignable relay-station identifications stored by the first radio base station.

6. The radio communication system according to claim 1, wherein the system comprises a plurality of radio base stations managed by the same management server, and each of the plurality of radio base stations store unique sets of assignable relay-station identifications such that the assignable relay-station identifications do not overlap between the sets.

7. The radio communication system according to claim 1, wherein the system comprises a plurality of radio base stations, wherein the plurality of radio base stations include a first radio base station and a second radio base station which is a handover candidate of a radio terminal connected to the first radio base station, and wherein the first radio base station and the second radio base station each store unique sets of assignable relay-station identifications such that the assignable relay-station identifications do not overlap between the sets.

8. The radio communication system according to claim 7, wherein the first radio base station notifies the radio terminal of the handover candidate information which includes assignable relay-station identifications stored by the second radio base station, in addition to assignable relay-station identifications stored by the first radio base station.

9. The radio communication system according to claim 1, wherein each relay-station identification includes an unique identifier and a communication parameter associated with the identifier, and wherein assigning one of the finite number of relay-station identification to the radio relay station comprises matching a communication property of the radio relay station to a communication parameter associated with the relay-station identification.

10. A radio base station connectable with a radio relay station and configured to connect to a radio terminal which performs a search on handover candidates according to handover candidate information indicating the handover candidates, the radio base station comprising:
    an assignment manager that assigns one of a finite number of relay-station identifications to a radio relay station when the radio relay station connects to the radio base station; and
    a notification unit configured to notify the radio terminal of the handover candidate information, wherein the handover candidate information comprises a predetermined number of station identification, the predetermined number being set based on the number of radio relay stations connectable to the radio base station at the same time.

11. The radio base station according to claim 10, wherein each of the finite number of relay-station identifications is associated with a communication property, and wherein assigning one of a finite number of relay-station identifications to a radio relay station comprises:
    determining which of the finite number of relay-station identifications is associated with a communication property of the radio relay station; and
    assigning the determined relay-station identification to the radio relay station.

12. A radio relay station connectable with a radio base station, wherein the radio relay station is configured to:
    when connecting with the radio base station, receive an assigned one of a finite number of relay-station identifications;
    transmit a radio signal comprising the assigned relay-station identification; and transmit handover candidate information to one or more radio terminals, wherein the handover candidate information comprises a predetermined number of station identifications.

13. The radio relay station according to claim 12, wherein the radio relay station is mobile and wherein the radio relay station connects to the radio base station by moving into a cell formed by the radio base station or by being turned on.

14. A radio communication method comprising the steps of:
- connecting, at a radio relay station, to a radio base station, wherein, when the radio relay station connects to the radio base station, the radio base station assigns one of a finite number of relay-station identifications to the radio relay station and transmits the assigned relay-station identification to the radio relay station, and the radio relay station subsequently transmits a radio signal comprising the assigned relay-station identification;
- connecting, at a radio terminal, to the radio base station;
- notifying, from the radio base station to the radio terminal, of the handover candidate information including a predetermined number of station identification, wherein the station identifications comprise the assigned relay-station identification, and wherein the predetermined number is set based on the number of radio relay stations connectable to the radio base station at the same time; and,
- subsequent to receiving the handover candidate information from the radio base station, at the radio terminal, performing a cell search according to the station identification included in the handover candidate information.

* * * * *